United States Patent [19]

Inoue

[11] Patent Number: 6,137,642
[45] Date of Patent: *Oct. 24, 2000

[54] RECORDING APPARATUS CAPABLE OF REALIZING EASY DUBBING OPERATION

[75] Inventor: Hiraku Inoue, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/753,003

[22] Filed: Nov. 19, 1996

[30] Foreign Application Priority Data

Nov. 27, 1995 [JP] Japan ................................. 7-329462

[51] Int. Cl.⁷ .................................................. G11B 27/02
[52] U.S. Cl. ................................ 360/13; 360/15; 360/31; 369/84; 369/83; 369/53
[58] Field of Search ................................ 360/57, 13, 15, 360/31, 69, 72.2, 74.4; 369/47, 84, 85, 83, 53, 32; 386/1, 4, 5, 46, 52, 7, 64; 358/906, 909.1

[56] References Cited

U.S. PATENT DOCUMENTS

| | | | |
|---|---|---|---|
| 4,916,681 | 4/1990 | Takamatsu | 369/14 |
| 5,097,461 | 3/1992 | Majima | 369/84 |
| 5,345,430 | 9/1994 | Moe | 369/7 |
| 5,418,654 | 5/1995 | Scheffler | 360/13 |
| 5,521,894 | 5/1996 | Hiranuma | 369/47 |
| 5,625,610 | 4/1997 | Hiranuma | 369/47 |
| 5,751,678 | 5/1998 | Tanaka | 369/84 |
| 5,889,747 | 3/1999 | Hisamatsu et al. | 369/84 |

*Primary Examiner*—Alan T. Faber
*Attorney, Agent, or Firm*—Jay H. Maioli

[57] ABSTRACT

A recording apparatus where a dubbing operation is easily performed by merely manipulating an operation unit by a user. The recording apparatus includes information unit discriminating circuitry for detecting a change in an information unit as to information reproduced in a reproducing unit; recording circuitry for recording the reproduced information entered therein on a recording medium; operation circuitry for instructing a recording operation of the information unit under reproducing operation while the reproducing operation is carried out by the reproducing unit; and control means for controlling the reproducing unit to execute the reproducing operation by returning the reproducing unit to a head position of the information unit under reproducing operation when the operation circuitry is operated, and for controlling the recording circuitry to perform the recording operation with respect to the recording medium while the change in the information unit is detected by the information unit judging circuitry as to the reproduced information reproduced from the reproducing unit during the reproducing operation.

8 Claims, 9 Drawing Sheets

FIG. 2

| | | 16bit | | 16bit | | |
|---|---|---|---|---|---|---|
| | MSB　　LSB | MSB　　LSB | MSB　　LSB | MSB　　LSB | |
| header | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | Sector(00h) | MODE(02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disk Serial No | 10 |
| corresponding table indication data part | Disk | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| (01h) | starting address | | | track mode | 78 |
| | end address | | | link information | 79 |
| (02h) | starting address | | | track mode | 80 |
| | end address | | | link information | 81 |
| (03h) | starting address | | | track mode | 82 |
| | end address | | | link information | 83 |
| management table part (255 part table) (FCh) | starting address | | | track mode | 580 |
| | end address | | | link information | 581 |
| (FDh) | starting address | | | track mode | 582 |
| | end address | | | link information | 583 |
| (FEh) | starting address | | | track mode | 584 |
| | end address | | | link information | 585 |
| (FFh) | starting address | | | track mode | 586 |
| | end address | | | link information | 587 |

U-TOC sector-0

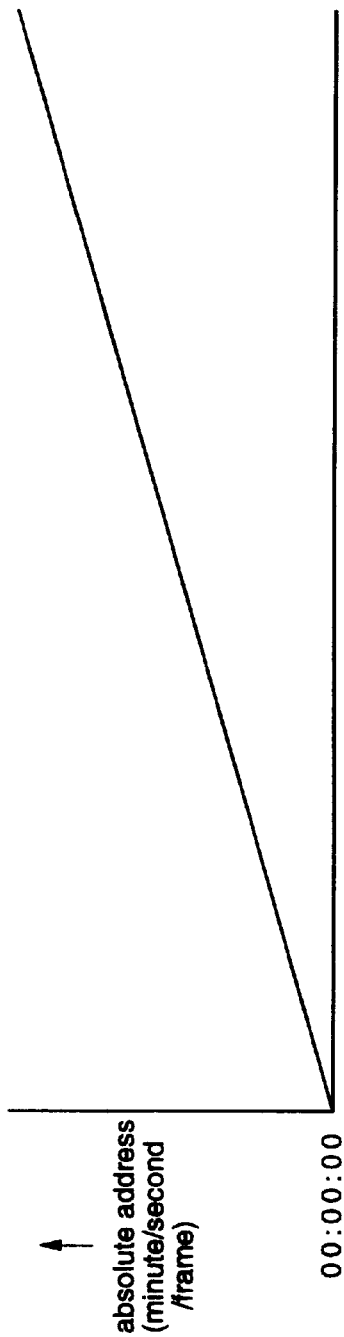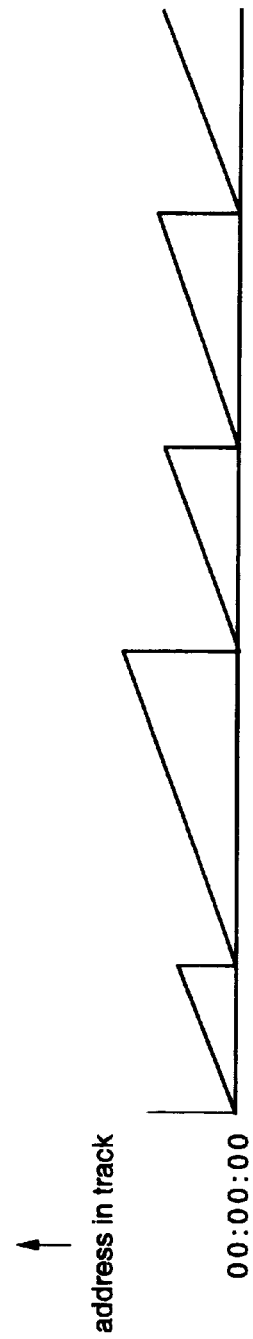
FIG. 4A   FIG. 4B   FIG. 4C

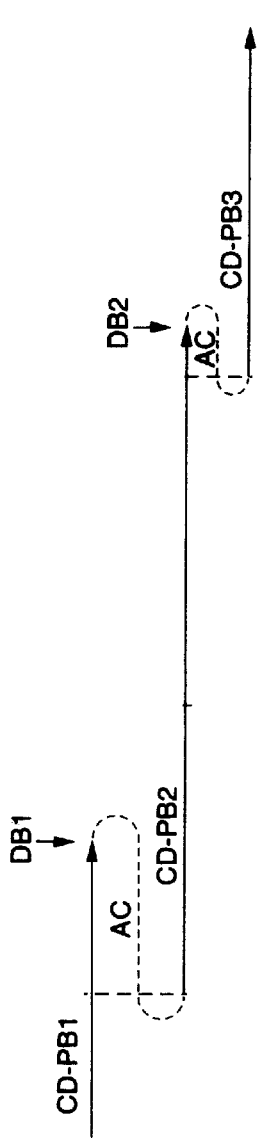
FIG. 6A  CD track
FIG. 6B  CD reproducing
FIG. 6C  MD recording
FIG. 6D  MD track
FIG. 6E  MD track
FIG. 6F  MD track

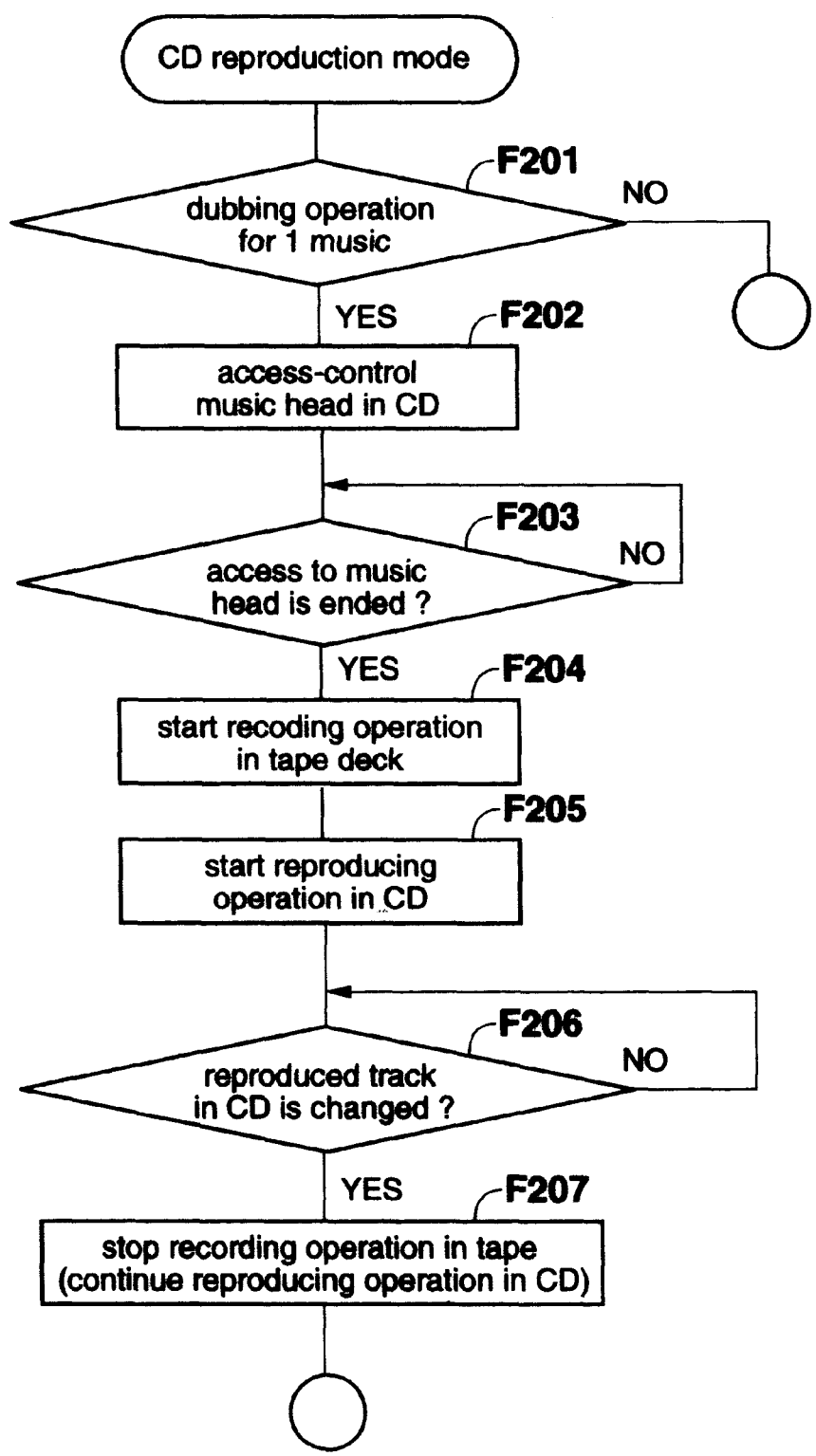

RECORDING APPARATUS CAPABLE OF REALIZING EASY DUBBING OPERATION

BACKGROUND OF THE INVENTION

1. Field of the Invention

The present invention relates to a recording apparatus capable of selectively recording audio information and the like reproduced by a reproducing unit.

2. Description of the Related Art

Conventionally, various sorts of recording apparatus have been widely marketed, on which users can record audio signals such as music and video signals, while using magnetic tapes and magneto optical disks as recording media.

For instance, as the conventional recording apparatus capable of recording audio signals, there are compact cassette recorders and DAT (digital audio tape) recorders using magnetic tapes, and further mini disk recorders employing optical disks.

Then, as described in, for instance, Japanese Laid-open Patent Application No.05-36246 entitled "CD REPRODUCING DAT RECORDING APPARATUS", the music signal reproduced from the compact disk (CD) is dubbing-recorded on the DAT tape in combination with the music title.

Thus, the user may collect only a series of his favorite music and record it on the DAT tape by executing the above-described dubbing operation.

Since the user may form the disk and tape on which only a series of his favorite music has been recorded, he may enhance his music enjoyment.

However, this dubbing operation would cause serious cumbersome dubbing operations to be given to the user.

For instance, in such a case that the user listens to his favorite music during the CD reproducing operation, if he wishes to record this favorite music on a mini disk(MD), then he must carry out the below-mentioned cumbersome dubbing operations. That is, the reproducing position is returned to a head portion of this favorite music in the CD player. On the other hand, he will prepare the recording operation of the MD recorder. Thereafter, the reproducing operation of the CD player is started at proper timing, and further the recording operation of the MD recorder is commenced.

OBJECTS AND SUMMARY OF THE INVENTION

As a consequence, an object of the present invention is to provide a recording apparatus having improved operability thereof.

Another object of the present invention is to provide a recording apparatus capable of dubbing-recording an information unit (music track etc.) desired by a user on a recording medium.

To achieve the above-described objects, the following recording apparatus is provided.

A recording apparatus, according to an aspect of the present invention, is featured by comprising:

information unit discriminating means for detecting a change in an information unit as to information reproduced in a reproducing unit;

recording means for recording the reproduced information entered therein on a recording medium;

operation means for instructing a recording operation of the information unit under reproducing operation while the reproducing operation is carried out by said reproducing unit; and control means for controlling said reproducing unit to execute the reproducing operation by returning said reproducing unit to a head position of the information unit under reproducing operation when said operation means is operated, and for controlling said recording means to perform the recording operation with respect to said recording medium while the change in the information unit is detected by said information unit discriminating means as to the reproduced information reproduced from said reproducing unit during said reproducing operation.

Also, a recording apparatus, according to another aspect of the present invention, is featured in that said free area discriminating means discriminates said recordable area based on a content of a table pointer of user TOC (Table Of Contents) information for a recording medium on which the entered reproduced information is recorded.

Further, a recording apparatus, according to another aspect of the present invention, is featured in that said information unit discriminating means detects the change in said information unit based upon an address of sub-code data contained in said reproduced information.

In addition, a recording apparatus, according to another aspect of the present invention, is featured in that when said operation means is operated, if the recordable area capable of recording the information unit under reproducing operation by said reproducing unit is not left in said recording medium, then said control means issues a warning by warning means.

BRIEF DESCRIPTION OF THE DRAWINGS

For a better understanding of the present invention, reference may be made to the accompanying drawings, in which:

FIG. 2 is an explanatory diagram for explaining U-TOC sector-0 of MD(mini disk);

FIG. 4A to FIG. 4C are explanatory diagrams for explaining address format of CD(compact disk);

FIG. 6A to FIG. 6F are explanatory diagrams for explaining the 1-music dubbing process operation of the recording apparatus according to the first embodiment;

FIG. 9 is a flow chart for describing a 1-music dubbing operation of the recording apparatus according to the third embodiment.

DETAILED DESCRIPTION OF THE PREFERRED EMBODIMENT

Referring now to drawings, various embodiments of a recording apparatus according to the present invention will be described. It should be understood that in the first and second embodiments, the recording apparatus of the present invention is accomplished as a MD(mini disk) recording apparatus with employment of a magneto optical disk (namely, mini disk), whereas in a third embodiment, the recording apparatus of the present invention is realized as a tape recorder with using an analog tape (compact cassette tape). Also, a reproducing apparatus unit employed in the respective embodiments is a CD player.

The detailed descriptions of the first to third embodiments will be made in accordance with the following ordered items:

1) ARRANGEMENT OF MD RECORDING APPARATUS AS FIRST EMBODIMENT.
2) U-TOC SECTOR.
3) 1-MUSIC DUBBING OPERATION IN FIRST EMBODIMENT.
4) ARRANGEMENT OF MD RECORDING APPARATUS AND 1-MUSIC DUBBING OPERATION IN SECOND EMBODIMENT.
5) ARRANGEMENT OF TAPE RECORDER IN THIRD EMBODIMENT.
6) 1-MUSIC DUBBING OPERATION IN THIRD EMBODIMENT.

1) ARRANGEMENT OF MD RECORDING APPARATUS AS FIRST EMBODIMENT

Figure 1:
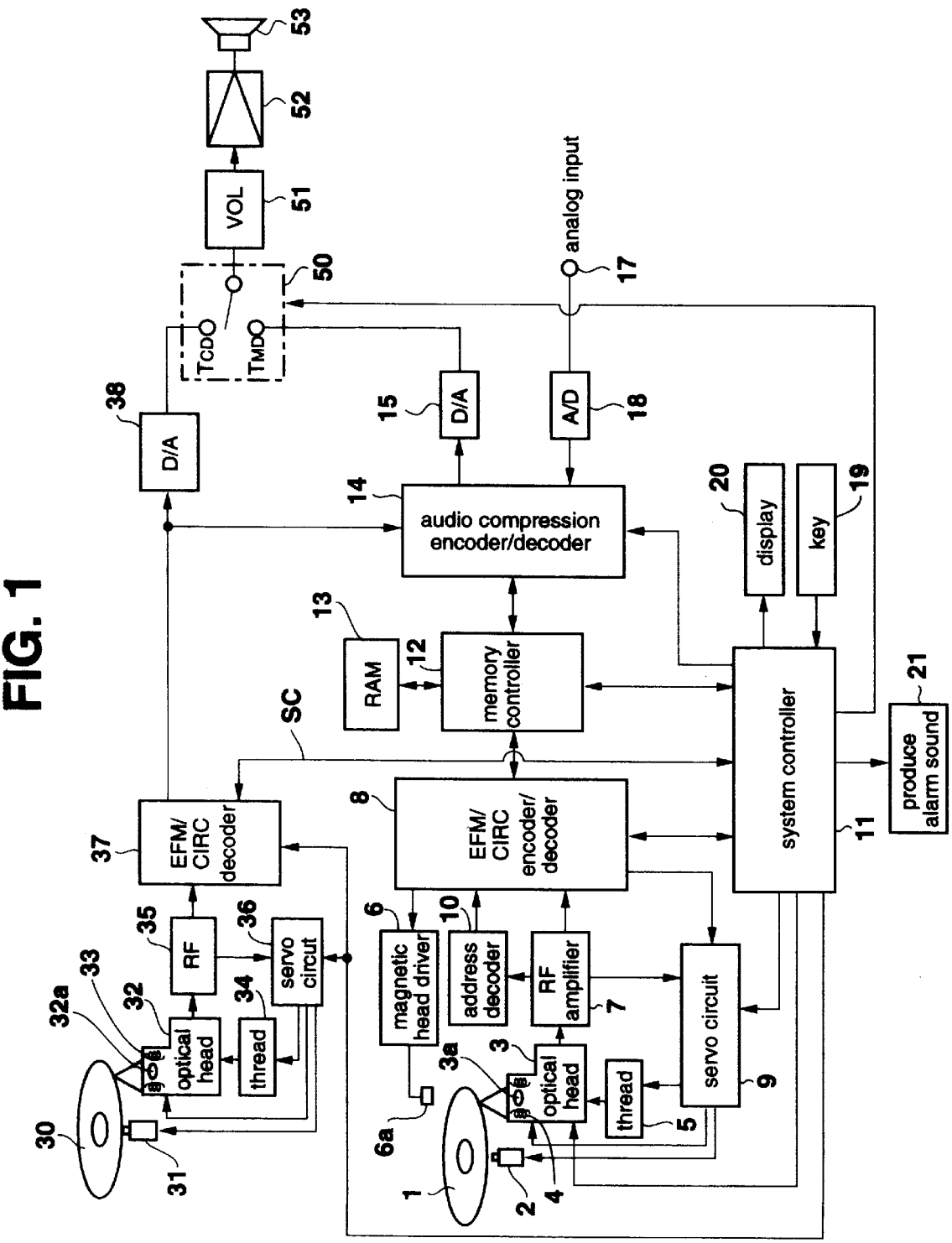
FIG. 1 is a schematic block diagram for representing an arrangement of a recording apparatus according to a first embodiment.

FIG. 1 is a schematic block diagram for showing a major arrangement of a recording/reproducing apparatus with employment of a magneto optical disk (mini disk), which constitutes an MD recording apparatus according to a first embodiment of the present invention.

In this case, this recording/reproducing apparatus may function as an MD-CD composite appliance which contains portions of not only the MD recording apparatus, but also a CD(compact disk) reproducing apparatus in an integral form.

In FIG. 1, an MD(magneto optical disk) 1 is employed as a medium capable of recording thereon audio date, and is rotatably driven by a spindle motor 2 during the recording/reproducing operation. An optical head 3 irradiates laser light onto the magneto optical disk 1 during the recording/reproducing operation to thereby be operated as a recording/reproducing head. In other words, the optical head 3 outputs the laser light having a high level in order to heat a recording track up to the Curie temperature during the recording operation, whereas the optical head 3 outputs the laser high having a relatively low level so as to detect data from reflection laser light by using the Kerr effect during the reproducing operation.

To this end, the optical head 3 is constituted by a laser diode functioning as a laser output means, an optical system made of a polarization beam splitter and an objective lens 3a, and also a detector for detecting reflection light. The objective lens 3a is held by a two-shaft mechanism 4 in a displacement manner in the disk radial direction and in the direction along which the optical head 3 is approached to/separated from the disk 1. The entire optical head 3 is movable by a thread mechanism 5 along the disk radial direction.

A magnetic head 6a is arranged in such a manner that this magnetic head 6a is positioned opposite to the optical head 3, while sandwiching the MD1. This magnetic head 6a applies a magnetic field to the MD1, which has been modulated by the data supplied thereto.

The magnetic head 6a is movable along the disk radial direction in combination with the optical head 3 by the thread mechanism 5.

During the reproducing operation, the information detected from the MD1 by the optical head 3 is supplied to an RF (radio frequency) amplifier 7. The RF amplifier 7 extracts a reproducing RF signal, a tracking error signal, a focusing error signal, groove information (namely, absolute positional information recorded on MD1 as pregroove, or wobbling groove), and the like by way of the calculation process for the information supplied thereto. The tracking error signal and the focusing error signal are supplied to a servo circuit 9. The extracted reproducing RF signal is furnished to an encoder/decoder unit 8. The groove information is supplied to an address decoder 10 so as to be demodulated. Both the address information decoded from the groove information, and the address information which is recorded as data and is decoded in an encoder/decoder unit 8 are supplied to a system controller 11 arranged by a microcomputer.

The servo circuit 9 produces various sorts of servo drive signals in response to the tracking error signal and focusing error signal supplied thereto, and also a track jump command, an access command, a rotation speed detection information, which are derived from the controller 11. Then, the servo circuit 9 controls the two-shaft mechanism 4 and the thread mechanism 5 so as to perform the focusing control and the tracking control. Also, the servo circuit 9 controls the spindle motor 2 in a constant linear velocity(CLV) manner.

The reproducing RF signal is decoding-processed in the encoder/decoder unit 8 by the EFM demodulation and the CIRC. Then, the decoded reproducing RF signal is once written into a buffer memory 13 by a memory controller 12. It should be noted that the data reading operation by the optical head 3 from the MD1 and the data transfer operation from the optical head 3 to the buffer memory 13 are performed at a data speed of 1.41 Mbit/sec.

The data written into the buffer memory 13 is read out at such timing that the transfer speed of the reproduced data becomes 0.3 Mbit/sec, and then the read data is supplied to the encoder/decoder unit 14. Thereafter, the reproduced data is processed in the encoder/decoder unit 14 by way of the decoding process for the audio compression by the modified DCT process, and the processed data is converted into an analog signal by a D/A converter 15. The analog audio signal derived from the D/A converter 15 is supplied to a terminal $T_{MD}$ of an output switch 50.

During the reproducing operation of the MD1, the system controller 11 controls the output switch 50 to connect the terminal $T_{MD}$. As a result, the audio signal reproduced from the MD1 is supplied via a volume control circuit 51 and an amplifier 52 to a speaker 53, so that the audio output is produced.

When the recording operation by the analog transmission is carried out for the MD1, a music signal derived from such an external appliance as a microphone, a CD player, a tape player, and other mini disk player is supplied to a terminal 17.

A recording signal (analog audio signal) supplied to the terminal 17 is converted into digital data which has been sampled at 44.1 KHz and quantized by 16 bits by way of an A/D converter 18. Thereafter, the resultant digital data is supplied to the encoder/decoder unit 14 so as to be processed by the audio compression/encode process. That is, the data amount of this digital data is compressed by approximately ⅕ by way of the modified DCT process.

The recording data which has been compressed in the encoder/decoder unit 14 is once written into the buffer memory 13 by the memory controller 12, and also is read out at preselected timing under control of this memory controller 12 to be supplied to the encoder/decoder unit 8.

Then, this compressed recording data is encode-processed by the encoder/decoder unit 8 by the CIRC encode and EFM modulation, and thereafter the encoded recording data is supplied to a magnetic head drive circuit 6.

In response to the encoded recording data, the magnetic head drive circuit 6 supplies a magnetic head drive signal to the magnetic head 6a. In other words, either an N-pole magnetic field or an S-pole magnetic field is applied to the MD1 by the magnetic head 6. At this time, the system controller 11 supplies a control signal to the optical head 3 in order that this optical head 3 may output the laser light having the recording level.

The CD (compact disk) 30 is rotatably driven by the spindle motor 31 in the constant linear velocity(CLV) during the CD reproducing operation. Then, the optical head 32 reads the data which have been recorded on the CD30 in the pit form, and supplies the read data to the RF amplifier 35. In the optical head 32, the objective lens 32a is held by the two-shaft mechanism 33, so that this objective lens 32a is a displaceable along the tracking direction and the focusing direction.

Also, the optical head 32 is movable by the thread mechanism 34 along the disk radial direction.

The RF amplifier 35 produces a focusing error signal and a tracking error signal other than the reproducing RF signal, and these error signals are supplied to a servo circuit 36. The servo circuit 36 produces various drive signals such as a focus drive signal, a tracking drive signal, a thread drive signal, and spindle drive signal from the focusing error signal and the tracking error signal. This servo circuit 36 controls the operations of the two-shaft mechanism 33, the thread mechanism 34, and the spindle motor 31.

The reproducing RF signal is supplied to a decoder 37. In this decoder 37, the decoding process such as the EFM demodulation and the CIRC decode is performed to this RF signal in order to decode the information read from the CD30 to obtain digital audio data which has been sampled at 44.1 KHz and quantized by 16 bits. In the decoder 37, such control data SC as TOC and sub-code are extracted, and are supplied to the system controller 11 so as to be utilized for executing various control operations.

The digital audio data outputted from the decoder 37 is converted by a D/A converter 38 into an analog audio signal, and this analog audio signal is furnished to another terminal $F_{CD}$ of the output switch 50.

Since the terminal $T_{CD}$ of the output switch 50 is selected by the system controller 11 during the CD reproducing operation, the audio signal reproduced from the CD30 is supplied via the volume control circuit 51 and the amplifier circuit 52 to the speaker 53.

Further, the data outputted from the decoder 37 is supplied to the encoder/decoder unit 14. As a result, the audio data reproduced from the CD30 may be dubbing-recorded on the MD1 by simultaneously performing the reproducing operation of the CD30 and the recording operation of the MD1.

A record key, a reproduce key, a stop key, an AMS key, and a search key are provided on the operation unit 19 in order to execute various operations when the user reproduces the CD30 and records/reproduces the MD1.

Also, in this first embodiment, a 1-music dubbing operation key for executing a 1-music dubbing operation (will be explained later) is provided on the operation unit 19.

The system controller 11 executes the control operations of the various units of this recording/reproducing apparatus in response to the operation information given from the operation unit 19, and an operation program stored in an internal ROM, so that the MD reproducing operation, the MD recording operation, and the CD reproducing operation are executed.

On the display unit 20, various sorts of information are displayed during either the operation of MD1 or CD30 under control of the system controller 11, for instance, time information such as total play time, reproducing time, and recording time, a track number, an operation condition, and an operation mode.

An alarm sound output unit 21 produces electronic sound (alarm sound) under control of the system controller 11. This electronic sound signal may be reproduced from an alarm-purpose speaker, or may be supplied to the amplifier circuit 52 so as to be reproduced from the speaker 53.

2) U-TOC SECTOR

On the other hand, when the recording/reproducing operation for the MD1 is carried out, the management information recorded on the MD1, namely P-TOC (premastered table of contents) and U-TOC (user table of contents) must be read out. The system controller 11 discriminates an address of an area to be recorded on the MD1, and an address of an area to be reproduced from the MD1 in response to these management information. The management information is saved in the buffer memory 13. To this end, the storage area of the buffer memory 13 is subdivided into a buffer area for storing thereinto the recording data/reproduced data during the recording/reproducing operations of the MD1, and another area for saving these P-TOC and U-TOC.

Then, when the MD1 is loaded, the system controller 11 executes the reproducing operation of the innermost area of this disk, on which the management information has been recorded, in order to read out this management information. The read management information is once stored in the buffer memory 13, so that this management information can be referred while this MD1 is recorded/reproduced in the subsequent operations.

The U-TOC is edited when the data is recorded/erased and is rewritten. The system controller 11 executes this editing process every time the data recording/erasing operations for the MD1 are carried out with respect the U-TOC information stored in the buffer memory 13. In response to this rewriting operation, the U-TOC area is similarly rewritten on the MD1 at preselected timing.

Now, a description will be made of the U-TOC sector as the management information used to manage the track recording/reproducing operations in the MD1.

It should be noted that as to the TOC information, the P-TOC(premastered TOC) information is provided in addition to the U-TOC. This P-TOC is formed in a pit area at the innermost area of the MD1, and corresponds to read-only information. Based on this P-TOC, positions of a recordable area (recordable user area), a readout area, and a U-TOC area in the disk are managed. It should be understood that a reproduce-only optical disk on which all of data have been recorded in a pit form may be utilized in a mini disk system. However, in case of a read-only disk, music which has been recorded in a ROM form by the P-TOC may also be managed, but the U-TOC is not formed.

A detailed description about the P-TOC is omitted, and then the U-TOC formed in a recordable magneto optical disk will now be explained.

FIG. 2 represents a format of a U-TOC sector 0.

It should be noted that although sectors "0" to "7" may be formed as the U-TOC sector, a sector 1 and a sector 4 are used to record character information whereas a sector 2 is used to record day/time of recording operation. In this case, only U-TOC sector 0 necessarily required for the recording/reproducing operation of MD1 will now be described.

The U-TOC sector 0 is used as a data region on which management information has been recorded as to a free area capable of recording new music and music which is mainly recorded by a user.

For instance, when a certain music is recorded on the MD1, the system controller 11 seeks a free area on the disk from the U-TOC sector 0, and then records audio data on this sought free area. During the reproducing operation, the area on which such music to be reproduced has been recorded is discriminated from the sector 0, and then the system controller accesses to this area so as to execute the reproducing operation.

In a data region (4 bytes×588=2,352 bytes) of the U-TOC sector 0, a sync (synchronization) pattern is recorded at a head position, and this sync pattern is formed by arranging 1 byte data constructed of all 0-bits or all 1-bits.

Subsequently, addresses which constitute a cluster address (Cluster H)(Cluster L) and a sector address(Sector), and further mode information (MODE) are added as 4 bytes, which constitute a header.

A sector is constituted by 2,352 bytes, and 36 sectors constitutes 1(one) cluster. These addresses are applied not only to this U-TOC sector 0, but also the P-TOC sector and other sectors in which audio data is actually recorded in unit of sector.

A cluster address is written by an upper address(Cluster H) and a lower address(Cluster L) in 2 bytes, and a sector address(Sector) is written in 1 byte.

Subsequently, data such as a maker code, a model code, a track number(First TNO) of a first track, a track number (Last TNO) of a last track, a sector use condition(Used sectors), a disk serial number, and a disk ID are recorded on a preselected byte position.

Furthermore, other areas are prepared on which various sorts of table pointers P-DFA, P-EMPTY, P-FRA, P-TNO1 to P-TNO255) are recorded as a corresponding table instruction data unit in order that the area of the track (music etc.) on which the music is recorded by the user, and the free area are discriminated from other area by being correspondence with a management table unit (will be explained later).

As the management table unit being correspondence with the table pointers (P-DFA to P-TNO255), 255 pieces of parts tables are employed. In each of these parts tables, a starting address as an origin for a certain part, an end address as an end point, and mode information (track mode) of this part are recorded. Moreover, since there is a possibility that parts indicated in the respective parts table are coupled to other parts, link information can be recorded which indicates a parts table on which a starting address and also an end address of this part to be coupled thereto.

It should be noted in this specification that a numeral value denoted by "h" corresponds to the hexadecimal notation. Also, a "part" implies a track portion on which temporally continued data within one track are recorded in a physically continued manner.

In a mini disk system, there is no problem in a reproducing operation, since the reproducing operation is carried out while accessing among parts even when data about one piece of music is physically discontinuously recorded, namely is recorded over a plurality of parts. Accordingly, to effectively utilize a recordable area, there are some cases that music recorded by a user is recorded over the plural parts.

To this purpose, the link information is provided. For instance, based on the numbers (01h) to (FFh) given to each of the parts tables, parts tables to be coupled with each other are designated, so that these parts tables can be coupled with each other.

In other words, in the management table unit in the U-TOC sector 0, one parts table represents one parts. For example, as to music constituted by coupling three parts with each other, the positions of these parts are managed by the three parts tables coupled with each other by the link information.

In an actual case, the link information is denoted by such a numeral value as a byte position in the U-TOC sector 0 by way of a predetermined calculation process. In other words, the parts table is designated as 304+(link information)×8 (8th byte).

The contents of the respective parts tables from (01h) to (FFh) in the management table unit of the U-TOC sector 0 are indicated by table pointers (P-DFA, P-EMPTY, P-FRA, P-TNO1 to P-TNO255) employed in the corresponding table designation data unit.

The table pointer P-DFA indicates a defect area on the MD1, and designates either a single parts table or a head parts table within the plural parts tables. This single parts table denotes a track portion (=part) for constituting a defect area caused by scratches. That is to say, when a defect part is present, any one of (01h) to (FFh) is recorded in the table pointer P-DFA. In the corresponding parts table, the defect part is denoted by the starting address and the end address. In the case that another defect part is present, another part table is designated as the link information in this parts table. Then, when there is no further other defect part, the link information thereof is selected as, e.g., (00h), and there is no link information subsequently.

The table pointer P-EMPTY indicates a single parts table, or a head parts table among a plurality of unused parts tables in the management table unit. In such a case that an unused parts table is present, any one of (01h) to (FFh) is recorded as the table pointer P-EMPTY. When there are a plurality of unused parts tables, the parts tables are sequentially designated by the link information from the parts table designated by the table pointer P-EMPTY, so that all of the unused parts tables are coupled with each other on the management table unit.

The table pointer P-FRA indicates a free area (containing an erasing area) on the MD1 on which data can be written, and designates a single parts table, or a head parts table within a plurality of parts tables for denoting a track portion (=part) which constitutes a free area. In other words, when a free area is present, any one of (01h) to (FFh) is recorded in the table pointer P-FRA. In the corresponding parts table, the part corresponding to the free area is indicated by either the starting address or the end address. Also, in such a case that a plurality of such parts are present, namely a plurality of parts tables are present, the parts tables are sequentially designated by the link information until the link information becomes (00h).

Figure 3:
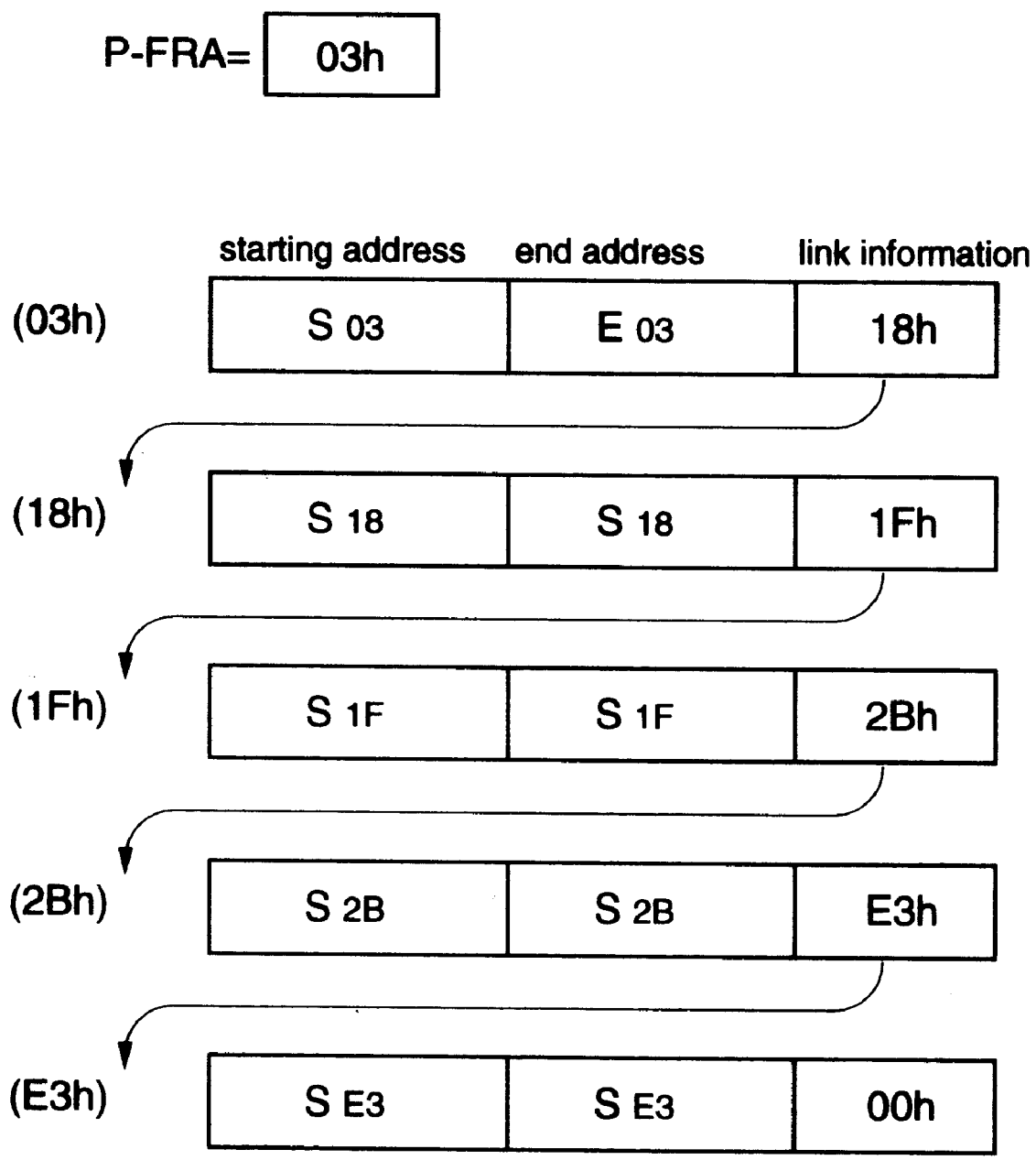
FIG. 3 is an explanatory diagram for explaining link format of U-TOC sector-0 of MD.

FIG. 3 schematically indicates management conditions of parts which constitute a free area by a parts table. This drawing represents such a state that when parts (03h), (18h), (1Fh), (2Bh), (E3h) constitute a free area, this state is expressed by linking the parts tables (03h), (18h), (1Fh), (2Bh), (E3h) succeeded to the corresponding table designation table P-FRA. It should be noted that a similar management state may be realized in the management conditions of the above-described defect region and the unused parts table.

On the other hand, if such a magneto optical disk having no defect is employed on which no audio data such as music is completely recorded, then the parts table (01h) is designated by the table pointer P-FRA, and this table pointer P-FRA represents that the entire recordable user area of this magneto optical disk corresponds to the free area. Then, in this case, since the remaining parts tables (02h) to (FFh) are not used, the parts table (02h) is designated by the above-explained table pointer P-EMPTY. Also, the parts table (03h) is designated as the link information of the parts table (02h), so that the parts tables up to the parts table (FFh) are coupled with each other. In this case, the link information of the parts table (FFh) is set to "00h" indicating that there is no subsequent coupling.

In this case, as to the parts table (01h), the starting address of the recordable user area is recorded as the starting address, whereas the address located immediately before the readout starting address is recorded as the end address.

The table pointers P-TNO1 to P-TNO255 show the tracks such as the music recorded on the MD1 by the user. For example, the table pointer P-TNO1 designates a parts table which indicates a head part among either one or plural parts on which the data of the first track is recorded, in view of temporal aspect.

For example, when the music set as the first track is recorded without subdividing the track thereof on the disk, namely recorded as one part, the recording area of this first track is recorded as the starting address and the end address in the parts table indicated by the table pointer P-TNO1.

In such an example case that the music set as the second track is recorded on a plurality of parts on the disk in a discrete manner, the respective parts are designated in the time sequential manner so as to indicate the recording position of the second track. In other words, other parts tables are furthermore successively designated in the time sequential manner by the link information from the parts table designated by the table pointer P-TNO2, and then the parts tables up to the parts table whose link information becomes (00h) are coupled to each other (similar condition as in FIG. 3).

As described above, all of the parts on which the data for constituting, for example, the second music has been recorded are sequentially designated so as to be recorded, so that when the second music is reproduced; or other music data is overwritten into the second music recorded area by using the data of this U-TOC sector 0, the optical head 3 and the magnetic head 6 are accessed to the recorded area in order to pick up the continuous music information from the discrete parts, and also the data can be recorded on the recordable area by effectively using this recordable area.

Since the U-TOC sector-0 is constructed in the above-described manner, it is possible to manage the addresses in the recording/reproducing operations of the MD1. Moreover, other process operations such as subdivisions of tracks, coupling of tracks, erasing of tracks, and replacements of track numbers may be carried out by merely updating this U-TOC sector-0.

Also, the free areas constituting the recordable areas on the MD1 are managed based on the table pointer P-FRA as illustrated in FIG. 3. Since the starting addresses and the end addresses of the free area parts are recorded on the parts tables to be linked, if a total of lengths (end address-starting address) of these free area parts is calculated, then it is possible to grasp the entire address length about the overall recordable area. Accordingly, when this entire address length is converted into temporal data, it is possible to calculate the recordable time by using this temporal data.

3) 1 -MUSIC DUBBING OPERATION IN FIRST MD RECORDING/REPRODUCING APPARATUS

Now, a description is made of an example of a recording operation as the 1-music dubbing operation realized by the MD recording/reproducing apparatus shown in FIG. 1.

The 1-music dubbing operation in this case is commenced by depressing the 1-music dubbing key provided on the operation unit 19 when the user wants to dubbing-record music of the CD30 under reproduction on the MD1. As the operation by the user, only this 1-music dubbing key is manipulated, so that the system controller 11 executes the necessary dubbing operation so as to record the music desired by the user on the MD1 in response to depressing of the 1-music dubbing key.

Referring now to a schematic illustration, this 1-music dubbing operation will be explained.

That is, FIG. 6A indicates a portion of a recorded track (music) in the CD30. In this drawing, the recording areas for five pieces of music are indicated as a track CD#1 to a track CD#5.

It is now assumed that the user performs the CD reproducing operation, and the reproduced sounds as, for example, as shown in FIG. 6B, the tracks CD#1 and CD#2 are outputted from the speaker 53 as represented as a reproducing operation CD-PB1.

At this time, it is further assumed that as indicated as an MD track (1) of FIG. 6B, the loaded MD1 is such a disk that one piece of music is recorded as the track MD#1, and, and the remaining areas are used as free areas.

Also, it is now assumed that when the reproducing operation CD-PB1 of the CD30 is advanced to a half way of the track CD#2, the user wishes to dubbing-record the music as this track CD#2 on the MD1 and then executes the 1-music dubbing operation at timing indicated as a DB1.

As a result, the system controller 11 causes the optical head 32 to access to a head position (denoted by a broken line) of the track CD#2. Then, the system controller 11 restarts the reproducing operation from the head position of the track CD#2 as indicated as the reproducing operation CD-PB2.

Also, when this reproducing operation CD-PB2 is commenced, the system controller 11 executes the recording operation for the MD1, as represented as MD-REC1 in FIG. 6C.

Both the reproducing operation CD-PB2 of the CD30 and the recording operation MD-REC1 to the MD1 are executed at the same time, so that the reproduced sounds of the track CD#2 can be dubbing-recorded on the MD1. That is, although the digital reproduced audio signal derived from the CD30 is also supplied to the encoder/decoder unit 14, this digital reproduced audio signal is compressed by the encoder/decoder unit 14. Thereafter, the compressed digital audio signal is supplied via the buffer memory 13 to the encoder/decoder unit 8, so that a so-called "modulation process" is performed to this compressed audio signal, and thus, the modulated digital audio signal is written into the free area of the MD1 by the magnetic head 6a.

When the reproducing operation CD-PB2 of the CD30 reaches the track CD#3, and the system controller 11 senses a change in the track numbers of the reproduced signal, the recording operation MD-REC1 is completed.

At this time, the U-TOC is rewritten in a predetermined manner in combination with the recording operation. In the MD1, such a condition is established. That is, as indicated as an MD track (2) of FIG. 6E, the audio data of the track CD#2 reproduced from the CD30 is recorded as the track MD#2 subsequent to the previously recorded track MD#1.

The reproducing operation CD-PB2 for the CD30 is continuously carried out even when the recording operation MD-REC is ended. Another assumption is made as the reproducing operation CD-PB2 as follows: While the track CD#4 is reproduced, if the user wants to dubbing-record the music recorded on this track CD#4 on the MD1, then the user again executes the 1-music dubbing operation at timing indicated as DB2 of FIG. 6B.

As a consequence, the system controller 11 causes the optical head 32 to access to a head position (denoted by a broken line) of the track CD#4. Then, the system controller 11 restarts the reproducing operation from the head position of the track CD#4 as indicated as the reproducing operation CD-PB3.

Also, when this reproducing operation CD-PB3 is commenced, the system controller 11 executes the recording operation for the MD1, as represented as MD-REC2 in FIG. 6C.

Both the reproducing operation CD-PB3 of the CD30 and the recording operation MD-REC2 to the MD1 are executed in this case, so that the reproduced sounds of the track CD#4 can be dubbing-recorded on the MD1.

Thereafter when the reproducing operation CD-PB3 of the CD30 reaches the track CD#5, and the system controller 11 senses a change in the track numbers of the reproduced signal, the recording operation MD-REC2 is accomplished.

At this time, the U-TOC is rewritten in a predetermined manner in combination with the recording operation. In the MD1, such a condition is established. That is, as indicated as an MD track (3) of FIG. 6F, the audio data of the track CD#4 reproduced from the CD30 is recorded as the track MD#3 subsequent to the previously recorded tracks MD#1, and MD#2.

As described above, in this first embodiment, when the user wishes to dubbing-record his favorite music while reproducing the CD30, he can merely execute the above-explained 1-music dubbing operation, so that this favorable music data can be dubbing-recorded on the MD1. In other words, the user can produce such an MD1 on which plural pieces of his favorable music have been dubbing-recorded without requiring the cumbersome dubbing operations.

Figure 5:
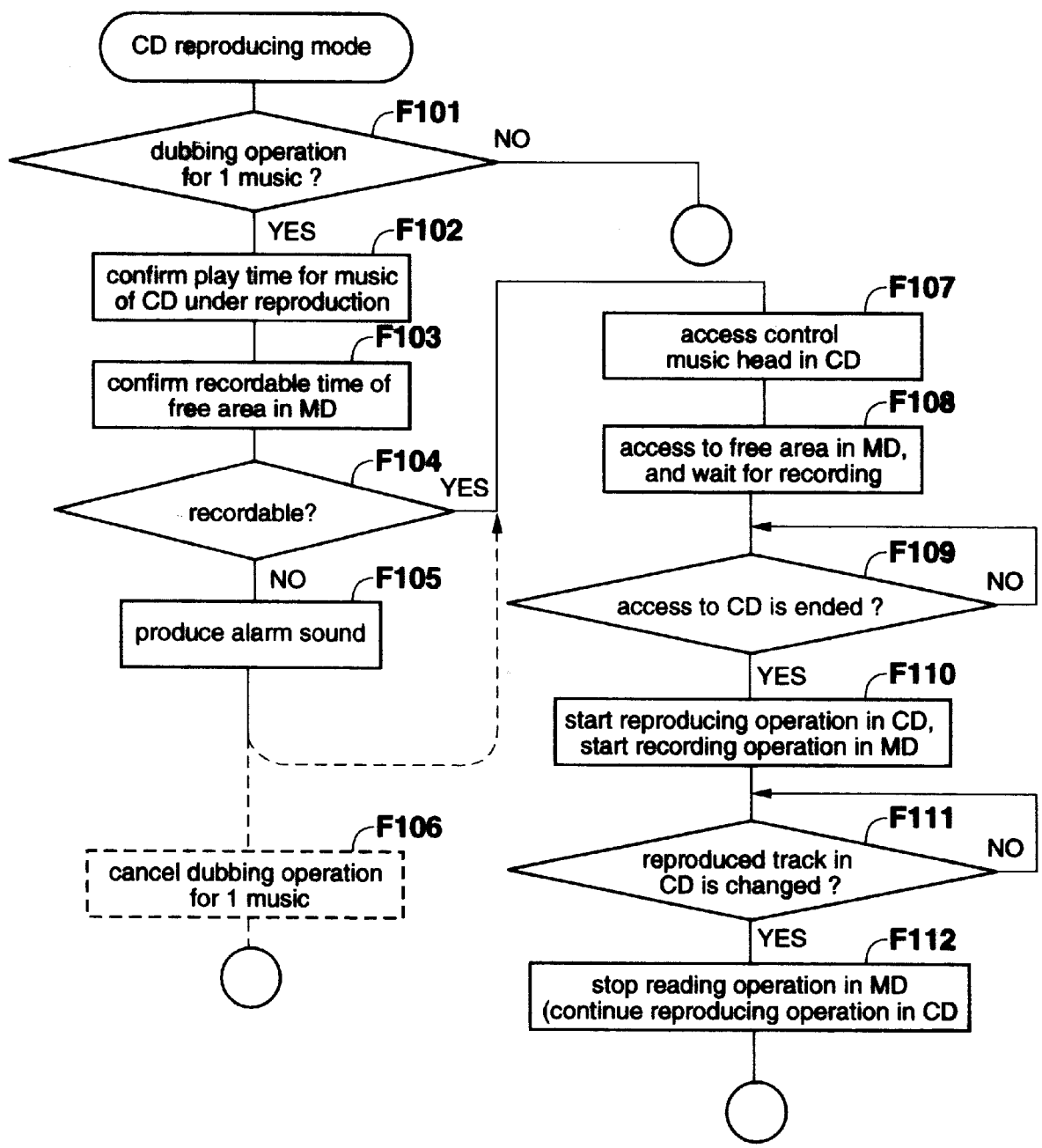
FIG. 5 is a flow chart for describing a 1-music dubbing process operation of the recording apparatus according to the first embodiment.

FIG. 5 shows a process operation by the system controller 11 in order to realize such a 1-music dubbing operation of the preferred embodiment.

As the reproducing mode of the CD30, when the normal reproducing operation, or a specific reproducing operation such as an introduction scanning operation is performed, the system controller 11 monitors the 1-music dubbing operation at a step F101. This special reproducing operation implies a reproducing operation in such a manner that only a head portion of certain music is reproduced for several seconds, the reproducing operation is advanced to the next music (track), and a series of this reproducing operation is repeated. Then, when the 1-music dubbing operation is carried out (instructed) by the user, this 1-music dubbing operation is commenced by which the music (track) under reproduction is dubbing-recorded on the MD1 in the above-described manner.

At a step F102, a confirmation is made of playing time for the track of the CD30 under reproduction.

In a compact disk, an address is recorded in a format of minute/second/frame, and also two sorts of absolute time (absolute address) and internal track time (internal track address) are recorded on minute/second/frame which will become an address. As the TOC information recorded on the innermost peripheral portion of the CD30, head positions of the respective tracks are recorded as the absolute address. As the sub-code data (Q channel data) simultaneously extracted during the data reproduction, both the absolute address and the internal track address are recorded. As indicated in FIG. 4A, the absolute address is given by that minute/second/frame of the head position of the track #1 is set to "00:00:00", and this numeral value is counted up until the outermost peripheral portion of the compact disk.

Assuming now that as represented in FIG. 4B, the tracks functioning as CD#1 to CD#5 are recorded on the CD30, the head position of each of these tracks is set to "00:00:00" (see FIG. 4C), and this numeral value is counted up until the end position of the track.

During the reproducing operation of the CD30, the system controller 11 previously reads the TOC information of the CD30. In this TOC information, the absolute addresses of the head positions of the respective tracks CD#1 to CD#n are recorded.

As a consequence, when play time of a certain track is to be determined, a head address of this track is subtracted from a head address of the next track, so that the play time of this track may be determined.

After the play time of the track under reproducing operation is confirmed at the step F102, recordable time of a free area in the MD1 under loading condition is calculated at the next step F103.

As previously explained, this recording time can be calculated by referring to the U-TOC of the MD1.

When the play time of the track under reproducing operation in the CD30 is shorter than the recordable time of the free area of the MD1 at this time, the dubbing-recording operation can be performed. Therefore, the process operation is advanced from the step F104 to a step F107 at which the process operation for the 1-music dubbing operation is executed.

On the other hand, if the recording time of the free area is shorter than the play time, since the music under reproducing operation cannot be completely dubbing-recorded, the process operation is advanced to a step F205. At this step F105, an alarm sound is produced from the alarm sound output unit 21, which announces to the user such a fact that the music under reproducing operation cannot be completely dubbing-recorded. Alternatively, this warning may be performed by employing the display unit 20, so as to display the warning information, instead of the alarm sound output unit 21. Furthermore, the alarm sound and the warning message display may be performed by using the alarm sound output unit 21 and the display unit 20.

After the alarm is produced at the step F105, the 1-music dubbing operation is canceled, or invalidated at a step F106 in order not execute the 1-music dubbing operation. Alternatively, as indicated by a broken line, the process operation is advanced to a step F107 at which the dubbing operation may be executed until the recordable free area of the MD1 is depleted.

In such a case that the process operation is advanced from the step F104 to the step F107 to execute the 1-music dubbing operation, the reproducing position by the optical head 32 is accessed to a head position of the music under reproducing operation.

Since the addresses of the head positions of the respective tracks #1 to #n recorded on the CD30 are written into the TOC information, the system controller 11 may acquire the addresses to be accessed from the TOC information.

Next, at a step F108, both the optical head 3 and the magnetic head 6a are accessed to a head position of the free area in the MD1, and are brought into a record waiting condition (record pause condition) at this access point. The address which constitutes the head position of the free area may be judged by the U-TOC information, as described above.

After the optical head 3 and the magnetic head 6a are brought into the record waiting state, the system controller 11 waits for such a fact that the access operation to the music head position on the side of the CD30 is completed (step F109). When this access operation is completed, the process operation is advanced to a step F110. At this step F110, the reproducing operation by the optical head 3 is commenced, and also the recording operation by the optical head 3 and the magnetic head 6a are commenced. As a result, the audio data reproduced from the track desired by the user in the CD30 are dubbing-recorded on the MD1.

During the dubbing-recording operation, the system controller 11 monitors the sub-code extracted from the data reproduced from the CD30, and judges as to whether or not the track number as the reproduced audio data is changed (step F111).

Then, when the track number is changed, the recording operation by the optical head 3 and the magnetic head 6a is stopped (step F112). At this time, the reproducing operation of the CD30 is continued.

It should be understood that the updating process of the U-TOC data in combination with the recording operation is performed.

The updating operation of the U-TOC data is carried out for the U-TOC data written in the buffer memory 13. Thereafter, at predetermined timing when the power supply is turned OFF or the MD1 is unloaded, the U-TOC data is actually rewritten.

With the above-described process operation, for example, the 1-music dubbing operation as explained in FIG. 6A to FIG. 6F can be realized. As a result, the dubbing operation by the user can be made very simple.

Also, in such a case that the last portion of the music favorably requested by the user cannot be dubbing-recorded on the MD1 due to the conditions of the free area of the loaded MD1, the alarm sound is outputted. As a result, the user can make a confirmation about this situation. Then, the user may take a necessary measure, for instance, by replacing this MD1 by another MD.

Furthermore, when the MD1 is used as the recording medium and the dubbing operation is required, the music is automatically recorded on the free area of the MD1. As a consequence, no longer such a cumbersome work load is required in which the user searches the recordable area within the MD1 in advance, and brings the optical head/magnetic head to the waiting conditions at this position.

4) ARRANGEMENT OF MD RECORDING APPARATUS IN SECOND MODE AND 1-MUSIC DUBBING OPERATION

Figure 7:
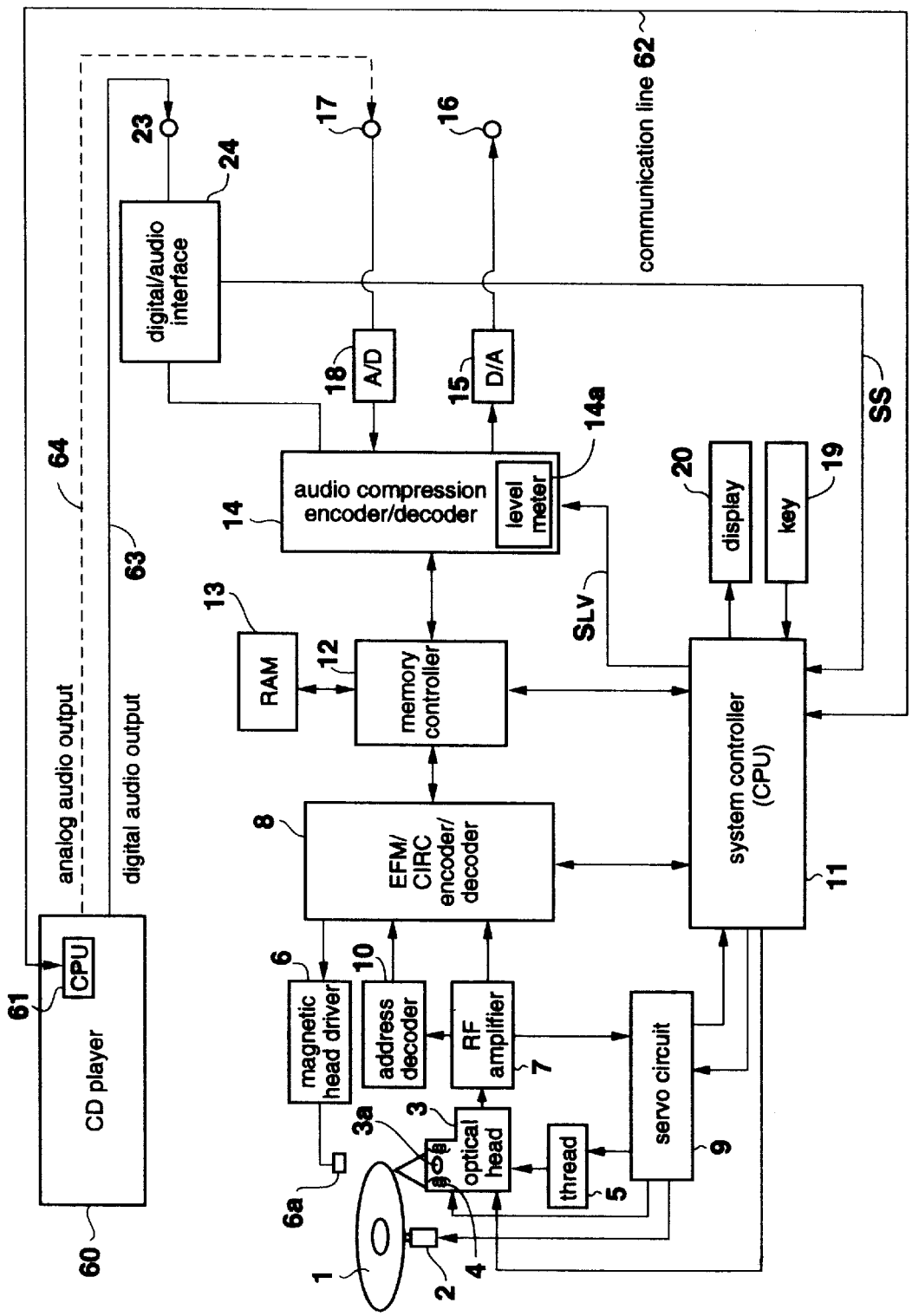
FIG. 7 is a schematic block diagram for representing an arrangement of a recording apparatus according to a second embodiment of the present invention.

Referring now to FIG. 7, an MD recording apparatus according to a second embodiment of the present invention will be described.

This embodiment is realized by that a CD player 60 functioning as a reproducing apparatus is separately provided with an MD recording/reproducing apparatus functioning as a major apparatus.

In other words, in FIG. 7, only portions of the recording apparatus according to the present invention correspond to those of a mini disk recording apparatus. It should be noted that the same reference numerals shown in FIG. 1 are employed as those for denoting the same, or similar functional portions of FIG. 7, and therefore, explanations thereof are omitted.

In FIG. 7, as blocks different from the MD recording/reproducing portions shown in FIG. 1, a terminal 23 and a digital audio interface unit 24 are provided. Also, a level meter unit 14a is provided in the encoder/decoder unit 14.

The terminal 23 corresponds to a terminal functioning as a digital audio interface with an external appliance. Data entered from this terminal 23 is supplied to the digital audio interface unit 24.

When the terminal 23 is connected with the digital audio interface unit 24, the audio information reproduced in the external CD player 60 and an external mini disk player is directly supplied to the MD recording apparatus in the digital audio data. At the same time, control data SS containing the sub-code information for the reproducing operation is transmitted in a preselected format. In this second mode, the terminal 23 is connected to the digital audio output terminal of the CD player 60 by a digital audio line 63, so that the digital audio data is supplied to the digital audio interface unit 24 by the reproducing operation in the CD player 60.

The digital audio interface unit 24 extracts audio data (sampled at 44.1 KHz, and quantized by 16 bits) from the supplied data, and supplies the extracted audio data as recording data to the encoder/decoder unit 14.

Also, the control data SS such as the sub-code information is extracted from the supplied data, and then this control data SS is supplied to the system controller 11. As the control data SS transmitted from the CD player 60, there are, for example, U-bit data, C-bit data, V-bit data, and P-bit data.

The U-bit data contains sub-code data known as so-called "Q data", "R data", "S data", "T data", "U data", "V data", and "W data". In other words, the U-bit data contains the above-explained absolute address, internal track address, track number, and so on. The C-bit data contains the category data used to discriminate the sort of recording medium, the sampling frequency data, the clock data, and the optical system data. The V-bit data contains the error flag and the like. Furthermore, the P-bit data is set as the parity bit. The system controller 11 controls various sorts of recording operations by using the necessary data among these control data SS.

A so-called "analog connection" is carried out as the connection form with the external appliance such as the CD player 60. In this analog connection, as indicated by a broken line of FIG. 7, the terminal 17 is connected to the analog audio output terminal of the CD player 60 via an analog audio line 64, and then an analog audio signal is supplied to the A/D converter 18 by the reproducing operation by the CD player 60.

Then, this analog audio signal is converted into digital audio data by the A/D converter 18, which is supplied to the encoder/decoder unit 14. When the external appliance is analog-connected with the MD recording apparatus, level information $S_{LV}$ of the entered audio signal is detected by the level meter unit 14a and then is supplied to the system controller 11.

The system controller 11 detects whether or not the audio data entered into the encoder/decoder unit 14 is brought into no sound condition based upon the level information $S_{LV}$. As a result, the system controller 11 can detect whether or not the audio signal reproduced from the CD player 60 is present at timing between the successive music (namely, track change).

Also, the system controller can communicate with a system controller 61 employed in the CD player 60 via a communication line 62. As a result, the system controller 11 may instruct the CD player 60 to execute the access operation and the reproducing operation.

With the above-described arrangement, the above-described 1-music dubbing operation can be executed.

That is, as explained in FIG. 6A to FIG. 6F while the reproducing operation is carried out in the CD player 60, when the user manipulates the operation unit 19 to execute the 1-music dubbing operation, the system controller 11 controls the CD player 60 in such a manner that a head position of a reproducing track of the CD is accessed, so as to restart the reproducing operation, both the optical head 3 and the magnetic head 6a are brought into the waiting state for the recording operation, and then the audio data recording operation is started at such timing when the audio data reproduced from the CD player 60 is inputted.

The system controller monitors a change in the reproducing track from the sub-code information attached to the audio data reproduced from the CD player 60, which is derived from the digital audio interface 24, and accomplishes the recording operation when the reproducing track is changed.

It should be noted that in the analog connection, the system controller monitors a change in the reproducing track by the level information SLV. For example, when the no sound condition is continued for a certain time period (approximately 2 to 5 seconds), the system controller may judge that the reproducing track is changed.

Also, in this second mode, when the 1-music dubbing operation is carried out, a process operation substantially equal to those defined at the steps F107 to F112 of FIG. 5 is executed, so that the 1-music dubbing operation can be realized.

In such a case that the TOC information contained in the CD reproduced in the CD player 60 may be received via the communication line 62, the system controller 11 also may execute the warning process operation defined at the steps F102 to F106 of FIG. 5.

As previously explained, the system controller 11 is connected to the system controller 61 of the CD player 60 via the communication line in the above-described case. If the wire connection is not available, then the system controller 11 may transmit a head-portion-seeking command from an infrared transmitter unit to the CD player 60. In the latter case, no warning process operation defined at the steps F102 to F106 of FIG. 5 can be executed. Alternatively, as the process operation at the step F107, the head-portion-seeking command is outputted to the CD player 60. Then, in the CD player 60, similar to the operations by the normal remote commander, the head position of the music under reproduction is accessed, and thereafter the reproducing operation of the music is commenced. In other words, the operation required for the 1-music dubbing operation can be performed in the CD player 60 with employment of the above-described measure, it is possible to perform the 1-music dubbing operation even when the control signal cannot be communicated between the system controller 11 and the external appliance.

5) ARRANGEMENT OF TAPE RECORDER IN THIRD EMBODIMENT

Figure 8:
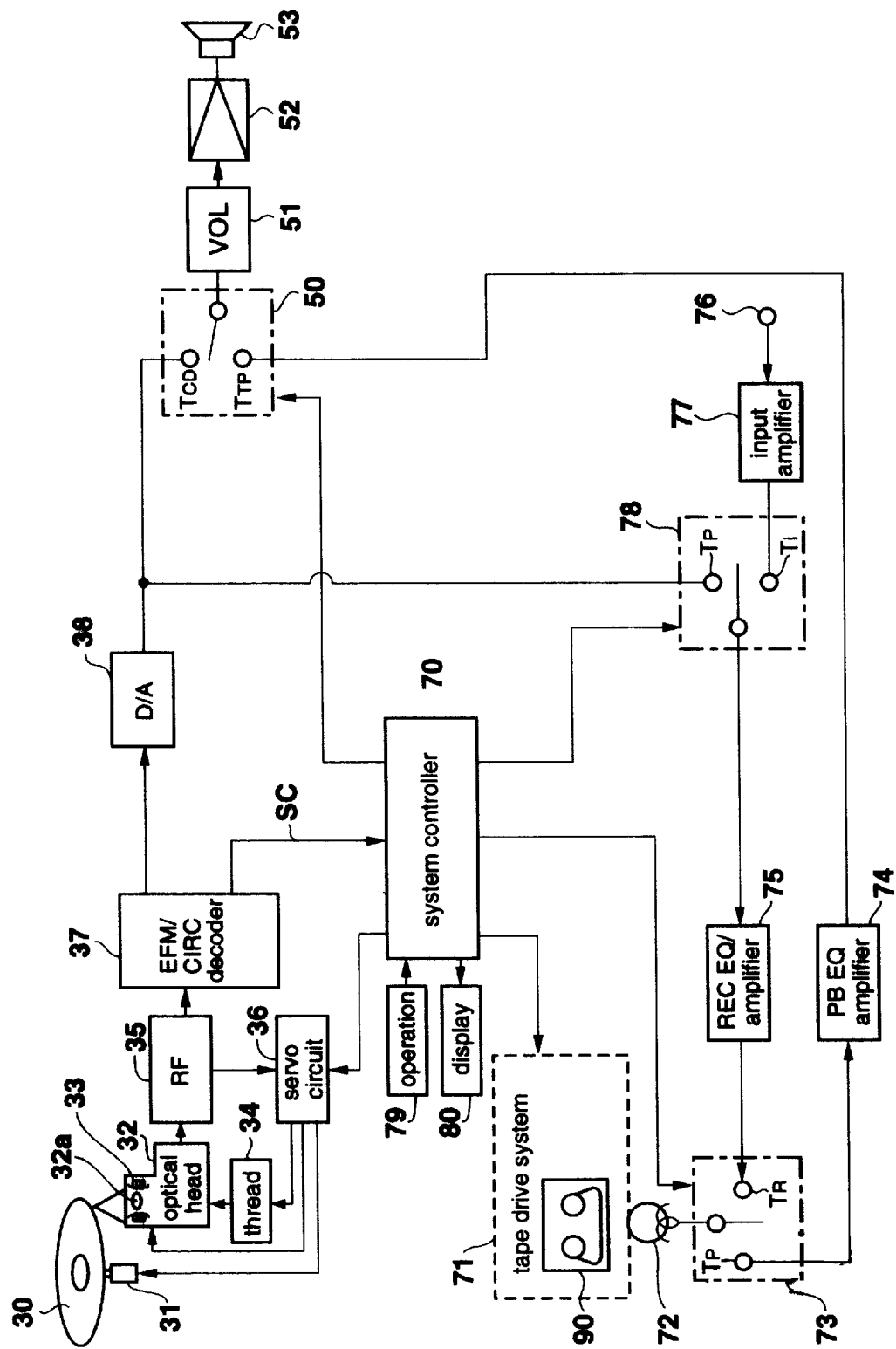
FIG. 8 is a schematic block diagram for indicating an arrangement of a recording apparatus according to a third embodiment of the present invention.

Referring now to FIG. 8, a description will be made of a third embodiment in which an analog tape recorder is employed as a recording apparatus unit, and a CD player is employed as a reproducing apparatus, and these analog tape recorder and CD player are constructed in an integral form.

It should be noted that the same reference numerals (CD player portion) shown in FIG. 1 are employed as those for denoting similar or same functional elements in FIG. 8.

In this case, a system controller 70 controls various portions of the CD player and also various portions of the analog tape recorder.

A compact cassette tape 90 is loaded on the tape recorder portion. A tape drive system 71 is a mechanism unit for driving the compact cassette tape 90, and is equipped with a capstan mechanism, a reel motor mechanism, and a head transport mechanism.

When the compact cassette tape 90 is reproduced, a signal read by a recording/reproducing head 72 is processed via a terminal $T_P$ of a recording/reproducing switch 73 by a reproducing amplifier/equalizer circuit 74, and the processed signal is supplied to a terminal $T_{TP}$ of a switch 54.

While the compact cassette tape 90 is reproduced, since the system controller 70 connects the switch 54 to the terminal $T_{TP}$, so that the audio signal reproduced from the compact cassette tape 90 is outputted via the volume control unit 51 and the amplifier circuit 52 to the speaker 53.

When the compact cassette tape 90 is recorded, an analog audio signal derived from an external appliance is supplied to the terminal 76. In this case, after the entered analog audio signal is amplified by an input amplifier 77, the amplified analog audio signal is supplied via a terminal $T_I$ of a switch 8 to a recording amplifier/equalizer circuit 75 so as to be processed in a predetermined manner. Then, the processed signal is supplied via a terminal $T_R$ of the recording/reproducing head 72, so that the audio signal is recorded on the compact cassette tape 90.

The audio data reproduced from the CD player unit is converted into an analog signal by a D/A converter 38. Then, this analog signal is supplied to a terminal $T_{CD}$ of the switch 54 and also to the terminal $T_D$ of the switch 78.

As a consequence, the system controller 70 connects the switch 78 to the terminal $T_D$, so that the CD-reproduced audio signal can be dubbing-recorded on the analog cassette tape 90.

Operation keys used to instruct various operations of the CD player unit and the tape recorder unit are arranged on the operation unit 79, and further a 1-music dubbing operation key is provided so as to execute the 1-music dubbing operation in this third mode.

A predetermined display operation is performed by the display unit 8 under control of the system controller 70 in response to the operations of the CD player unit and the tape recorder unit.

6) 1-MUSIC DUBBING OPERATION IN THIRD EMBODIMENT

In this third embodiment, a process operation by the system controller 70 to realize the 1-music dubbing operation will now be explained with reference to a flow chart of FIG. 9.

When either the normal reproducing operation or the special reproducing operation such as a so-called "introduction scanning operation" is carried out as the reproduction mode of the CD30, the system controller 70 monitors the 1-music dubbing operation by the user at a step F201. Then, when the user instructs the 1-music dubbing operation, this 1-music dubbing operation is commenced in such a manner that the music (track) under reproducing operation at this time is dubbing-recorded on the analog cassette tape 90.

At a first step F202, the optical head 32 is accessed to a head position of this music under reproducing operation as the reproducing position.

Next, at a step F203, the system controller 70 waits for the completion of the head access operation to the head position of the music in the CD30. After this access operation is accomplished, a recording operation for the analog cassette tape 90 is commenced at a step F204. A concrete control operation is performed as follows. The switch 72 is connected to the terminal $T_D$, the recording/reproducing switch 73 is connected to the terminal $T_R$, and the tape is traveled by the tape drive system 71, and furthermore, the recording/reproducing head 7 is made in contact with the magnetic tape surface of this analog cassette tape 90 under certain pressure.

Then, at a step F205, the reproducing operation by the optical head 32 is started. As a result, the audio data reproduced from the track of the CD30 desired by the user is dubbing-recorded on the analog cassette tape 90.

While performing the dubbing-recording operation, the system controller 70 monitors the sub-codes extracted from the data reproduced from the CD30, and judges as to whether or not the track number as the reproduced audio data is changed (F206).

Then, when the track number is changed, the recording operation for the analog cassette tape 90 is stopped (F207). At this time, the reproducing operation of the CD30 is continuously carried out.

By performing a series of the above-described operation, the 1-music dubbing operation for the analog cassette tape 90 can be realized, so that the dubbing operation by the user can be made very simple.

In such a case that a mechanism for detecting a tape travel position is provided so as to detect a tape remaining amount, the warning process operation defined at the steps F102 to F106 of FIG. 5 may be carried out.

It should be understood that when such a tape medium as in this third embodiment is employed as the recording medium, the user should set the tape travel position to a position where the recording operation is available.

While various preferred embodiment modes have been described, the present invention is not limited thereto, but may be modified.

For instance, in the above cases, the MD and the analog cassette tape are used as the recording medium. Alternatively, the present invention may be applied to such a recording apparatus as a DAT with employment of a digital audio tape recording medium and a solid-state memory.

Furthermore, the present invention may be applied to a recording apparatus capable of dubbing-recording not only audio data, but also video data.

As previously described in detail, in accordance with the recording apparatus of the present invention, when the 1-music dubbing operation is instructed by manipulating the operation means, the head is returned to the head position (in unit of information) of the recording medium under reproducing operation so as to execute the reproducing operation by the reproducing apparatus unit. Also, as to the reproduced information inputted from the reproducing apparatus unit by this reproducing operation, the recording operation by the recording means for the recording medium is executed while a change in the information unit (track) is detected by the information unit judging means. As a consequence, the dubbing operation by the user can be made very simple, and the operability of this recording apparatus can be improved. In other words, while the user listens to the reproduced signal (for example, reproduced music) from the reproducing apparatus unit, if he wishes to dubbing-record this reproduced music, then he merely instructs the recording apparatus to perform the 1-music dubbing operation.

Also, according to the present invention, there is another advantage as follows. When the operation means is manipulated, in such a case that the recordable area is not left in the recording medium, in which the information unit under reproducing operation by the reproducing apparatus unit cannot be recorded, the warning output is produced from the warning output means. Therefore, when the music which is wanted to be dubbing-recorded by the user cannot be fully dubbing-recorded, the user can recognize this fact by receiving such a warning output. Then, the user may take the proper measure, for instance, may replace this recording medium by another recording medium.

What is claimed is:

1. A dubbing system comprising:

reproducing means for reproducing an audio program from a first recording medium;

recording means for recording the audio program to a second recording medium;

operation means having a single dubbing operation key actuated by a user for indicating a desired operation, when said user would like to record a desired audio program from a plurality of audio programs on the first recording medium to the second recording medium during an audition by the user of the desired audio program being reproduced from the first recording medium;

control means operable in response to actuation by the user of the single dubbing operation key for controlling the reproducing means to return to a beginning of the desired audio program to again reproduce the desired audio program and for controlling the recording means to record the desired audio program on the second recording medium, so as to synchronize a dubbing operation to start both the reproducing means and the recording means upon the actuation of the dubbing operation key; and detecting means for detecting an end of the desired audio program supplied from the reproducing means to the recording means, wherein the control means controls the recording means to stop the recording operation, when the detection means detects the end of the desired audio program.

2. The dubbing system according to claim 1, further comprising:

detecting means for detecting recordable capacity of the second recording medium; and comparison means for comparing the detected recordable capacity of the second recording medium and a capacity required for storing the desired program, and wherein when the capacity of the desired program is longer than the recordable capacity of the second recording medium, the control means controls to stop the dubbing operation.

3. The dubbing system according to claim 2, further comprising:

warning means for warning the user of a lack of recordable area of the second recording medium.

4. The dubbing system according to claim 1, wherein said recording means includes means for recording table of contents information on said second recording medium after said control means controls said recording means to stop the recording operation.

5. The dubbing system according to claim 1, wherein said control means includes means for determining a play time for the desired audio program on the first recording medium;

means for determining a recordable time of a free area on the second recording medium;

means for controlling the recording means to cancel recording when the determined play time exceeds the determined free area on the second recording medium.

6. The dubbing system according to claim 5, further comprising alarm means for informing the user that the determined play time exceeds the determined free area on the second record medium.

7. The dubbing system according to claim 6, wherein said alarm means provides an audible alarm.

8. The dubbing system according to claim 6, wherein said alarm means provides a visual alarm.

* * * * *